US008618230B2

(12) United States Patent
Odobel et al.

(10) Patent No.: US 8,618,230 B2
(45) Date of Patent: Dec. 31, 2013

(54) METHOD FOR CROSSLINKING BY THERMAL HUISGEN REACTION, CROSSLINKABLE CHROMOPHORIC POLYMERS, AND CROSSLINKED POLYMER SUBSTANCES HAVING STABLE ELECTRO-OPTICAL PROPERTIES

(75) Inventors: Fabrice Odobel, Nantes Cedex 3 (FR); Annabelle Jenny Scarpaci, Nantes Cedex 3 (FR); Errol Blart, Nantes Cedex 3 (FR); Laurent Fontaine, Le Mans Cedex 09 (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 510 days.

(21) Appl. No.: 12/937,662

(22) PCT Filed: Apr. 17, 2009

(86) PCT No.: PCT/FR2009/050720
§ 371 (c)(1),
(2), (4) Date: Nov. 15, 2010

(87) PCT Pub. No.: WO2009/138643
PCT Pub. Date: Nov. 19, 2009

(65) Prior Publication Data
US 2011/0065864 A1    Mar. 17, 2011

(30) Foreign Application Priority Data

Apr. 18, 2008  (FR) ..................................... 08 52630

(51) Int. Cl.
*C08F 8/00* (2006.01)
*C08J 7/18* (2006.01)
*B05D 3/02* (2006.01)
*C08F 130/08* (2006.01)

(52) U.S. Cl.
USPC ............. 526/261; 427/387; 427/487; 525/55; 526/279

(58) Field of Classification Search
USPC ............. 526/261, 279; 427/387, 487; 525/55
See application file for complete search history.

(56) References Cited

U.S. PATENT DOCUMENTS

2006/0049387 A1    3/2006  Huang

FOREIGN PATENT DOCUMENTS

| CA | 2346149 | 5/2001 |
| EP | 0641808 | 3/1995 |
| WO | 02/29488 | 4/2002 |
| WO | 2004/065615 | 8/2004 |

OTHER PUBLICATIONS

Scarpaci et al. A new crosslinkable system based on thermal Huisgen reaction to enhance the stability of electro-optic polymers, Chem. Commun., Mar. 6, 2009, 1825-1827).*
Han et al. (Three-Dimensional Photoreorientation of Self-Organized Azobenzene Chromophores in Liquid Crystalline Polymer Films, Mat. Res. Soc. Symp. Proc. vol. 559 1999, 159-164).*
Bai et al., J. Am. Chem. Soc., 127:2060-2061 (2005).
Binder et al., Macromol. Rapid Commun., 28:15-54 (2007).
Bock et al., Eur. J. Org. Chem., 51-68 (2006).
Bosc et al., J. Appl. Polym. Sci., 74:974-982 (1999).
Burland et al., Chem. Rev., 94:31-75 (1994).
Cohen et al., J. Polym. Sci.: Polym. Chem. Ed., 19:1337-1347 (1981).
Cohen et al., J. Polym. Sci.: Polym. Chem. Ed., 19:3269-3284 (1981).
Dalton et al., J. Mater. Chem., 9:1905-1920 (1999).
Dalton et al., Proc. SPIE, 503502-1 (2010).
Diaz et al., J. Polym. Sci.: Part A: Polym. Chem., 42:4392-4403 (2004).
Enami et al., Nature Photonics, 1:180-185 (2007).
Fournier et al., Chem. Soc. Rev., 36:1369-1380 (2007).
Haller et al., Macromolecules, 37:688-690 (2004).
James et al., J. Appl. Polym. Sci., 87:1852-1857 (2003).
Jen et al., Proc. SPIE, 593506-1 (2010).
Kang et al., J. Am. Chem. Soc., 129:3267-3286 (2007).
Ladmiral et al., J. Am. Chem. Soc., 128:4823-4830 (2006).
Lee, Appl. Phys. Lett., 79(9):1342-1344 (2001).
Levenson et al., Polymers for Second-Order Nonlinear Optics, Eds. Geoffrey A. Lindsay and Kenneth D. Singer, ACS Symposium Series 601, "Advances in Organic Polymer-Based Optoelectronics," Chapter 32, pp. 436-455 (1995).
Li et al., J. Polymer Sci.: Part A: Polymer Chemistry, 45:4300-4308 (2007).
Luo et al., J. Phys. Chem. B, 108:8523-8530 (2004).
Luo et al., Macromolecules, 37:248-250 (2004).
Luo et al., Org. Lett., 9(22):4471-4474 (2007).
Lutz, Angew. Chem. Int. Ed., 46:1018-1025 (2007).
Ma et al., J. Am. Chem. Soc., 123:986-987 (2001).
Rostovtsev et al., Angew. Chem. Int. Ed., 41(14):2596-2599 (2002).
Sumerlin et al., Macromolecules, 38:7540-7545 (2005).
Tornoe et al., J. Org. Chem., 67:3057-3064 (2002).
Vogt et al., Macromolecules, 39;5286-5292 (2006).

* cited by examiner

*Primary Examiner* — Ling Choi
*Assistant Examiner* — Chun-Cheng Wang
(74) *Attorney, Agent, or Firm* — McAndrews, Held & Malloy Ltd.

(57) ABSTRACT

The present invention relates to a method for crosslinking chromophoric-group polymers by thermal Huisgen reaction on thermopolymerizable chromophoric polymers having at least one azide function and/or one alkyne function, and on crosslinked polymerized substances having a well-stabilized chromophoric orientation.

25 Claims, 3 Drawing Sheets

Figure 1:
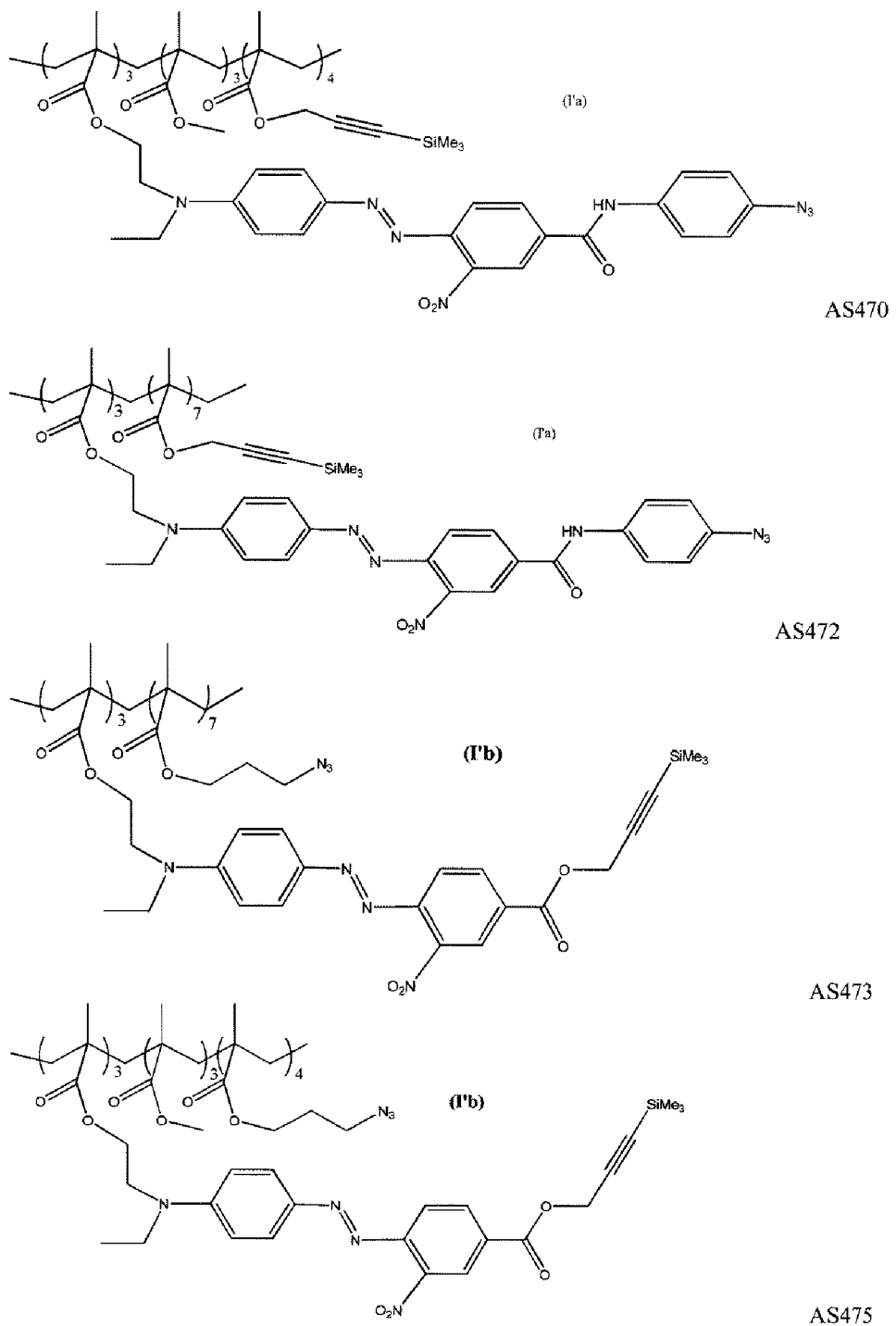

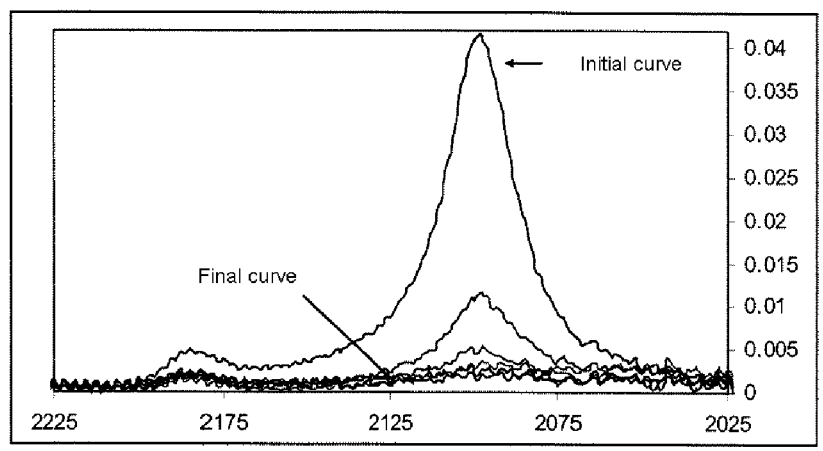
Fig.2
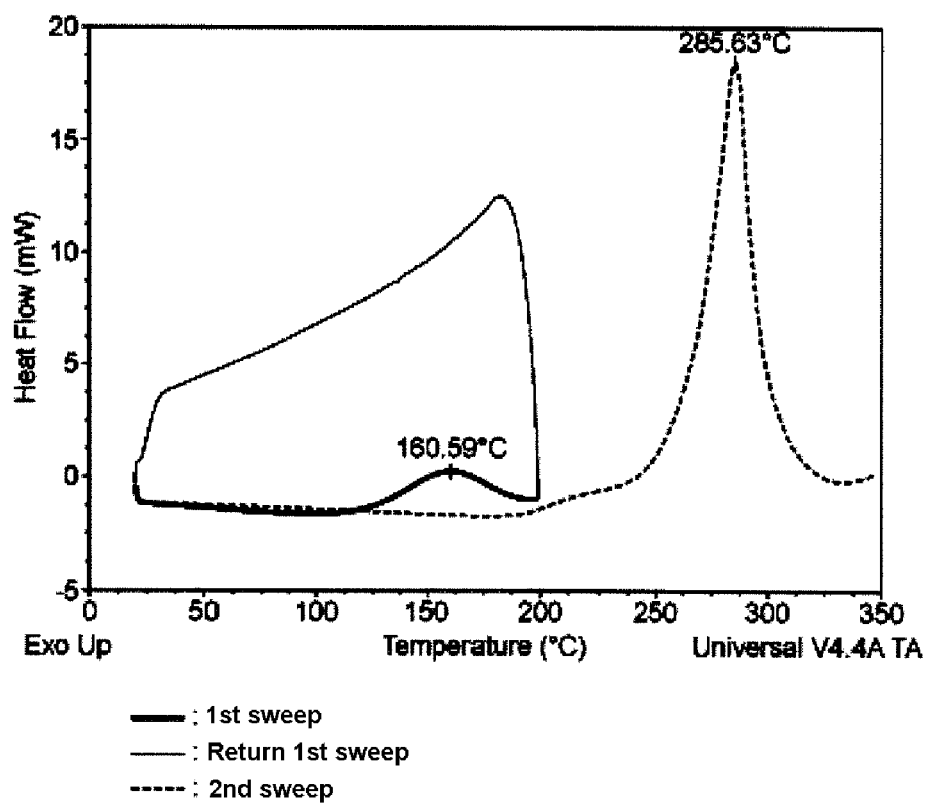
Fig:3

METHOD FOR CROSSLINKING BY THERMAL HUISGEN REACTION, CROSSLINKABLE CHROMOPHORIC POLYMERS, AND CROSSLINKED POLYMER SUBSTANCES HAVING STABLE ELECTRO-OPTICAL PROPERTIES

The present application is filed pursuant to 35 U.S.C. 371 as a U.S. National Phase application of International Patent Application No. PCT/FR09/50720, which was filed Apr. 17, 2009, claiming the benefit of priority to French Patent Application No. 0852630, which was filed on Apr. 18, 2008. The entire text of the aforementioned applications is incorporated herein by reference in its entirety.

The present invention relates to a new process for crosslinking chromophoric polymers, by thermal Huisgen reaction, on crosslinkable chromophoric polymers and on crosslinked polymeric materials with nonlinear optical properties showing high alignment stability of the chromophores. Such materials may constitute the active material of electrooptic modulators.

Electrooptic modulators are widely used devices in broadband communication systems and for data processing. At the present time, the active material in commercial electrooptic modulators is generally lithium niobate ($LiNbO_3$), but its properties make it unsuitable for a throughput greater than 100 MHz.[1] Moreover, its control voltage is ranges from 3 to 6 V and increases with the frequency modulation of the electrical signal. This is why attempts have been made to replace it with an organic polymer with electrooptic properties, which has many advantages, especially a greater ease of forming, an increase in the bandwidth and a reduction in the control voltage and in the manufacturing cost. At the present time, the best organic materials have electrooptic coefficients of about 300 pm/V, which has made it possible to manufacture Mach-Zehnder modulators with a half-wave voltage ($V\pi$) of less than 1 V.[2-5] These recent results, arising from the studies made by the Dalton team, demonstrate the great interest of polymer materials in this field.[3-6] After several years of research by many teams worldwide, it is now widely accepted that one of the main limitations of electrooptic polymers is associated with the instability over time of the orientation of the active molecules generally referred to as chromophores.[6,7] Indeed, the holding of the non-centrosymmetric molecular order needs to be improved in order to facilitate the industrial development of materials of this type. Doped polymers, which consist of a mixture of chromophores diluted in a polymer matrix, show very poor orientation stability, since their relaxation is reached after about a hundred hours at temperatures very much lower than 80° C.[6,7] A greater stability is obtained when the chromophores are grafted to the polymer matrix, but it remains, however, insufficient for commercial applications.[6,7] The two most efficient strategies for thwarting the relaxation of chromophores are, firstly, the use of polymer matrices with a high glass transition temperature (Tg) and, secondly, the use of crosslinkable polymers. The latter approach consists in introducing reactive functions, borne either on the polymer or on the chromophore, or alternatively on an associated compound (dopant) which will react together after the orientation step (poling) thermally (heating above the Tg) or photochemically (illumination with light generally of the UV spectrum). This crosslinking process can indeed afford long-lasting setting of the orientation of the chromophores after they have been oriented, but very few chemical systems are suitable to this approach. The difficulty arises from the fact that the crosslinking functions must fulfill two properties that are difficult to reconcile. The first is to remain inert during the polymerization and storage step (to avoid premature crosslinking of the polymer), and the second is to offer high reactivity around the Tg (in order to have a high crosslinking yield). Four main types of system currently exist for the crosslinking of polymers with electrooptic properties: these are the maleimide/anthracene couple[3,8], which react to form an adduct via the Diels-Alder reaction, the homocondensation reaction of a trifluoroethylene[9] or benzocyclobutanone[10,11] species, and finally the system developed by Bosc et al.[12] which consists in opening an epoxide function with a carboxylic acid group. Although they are effective for stabilizing the alignment of chromophores[11,13], each of these approaches has its own limitations. For example, the polymer (PIII) of Bosc et al. has low stability at room temperature, which limits its storage. Furthermore, it is difficult to manufacture thick films (>1 µm) and the crosslinked film may show significant absorbance at 1.5 µm on account of the alcohol functions that are formed. The systems based on the Diels-Alder reaction often react with the double bonds of the chromophore; this causes degradation of the latter.[4] Finally, the thermal decomposition of benzocyclobutanone to ketene takes place at a very high temperature (200° C.), which is incompatible with many chromophores that are unstable at this temperature. In each of these approaches, the filmability of the polymers is often not discussed, although this characteristic is, however, essential for the intended application.

The present inventors have found that it is possible to overcome these difficulties by using a new crosslinking mode that consists in using the thermal Huisgen reaction.

Although this Huisgen reaction has been widely used in various fields of chemistry[16-20] following the simultaneous discovery by Sharpless et al.[14] and Meldal et al.[15] that copper (I) salts catalyze this reaction, the uncatalyzed reaction in which the reagents react by thermal activation has been the subject of much less attention. In 1981, an Eastman Kodak laboratory reported the functionalization of polymers containing azide functions as side groups according to the Huisgen 1,3-cycloaddition reaction by heating with various alkynes.[21] To the Applicants' knowledge, the Huisgen reaction by thermal activation has, however, never been used to induce the crosslinking of a polymer and particularly in the field of materials with nonlinear optical properties.

One subject of the present invention is thus a process for crosslinking polymers containing chromophoric groups, by thermal Huisgen reaction.

This new crosslinking method proves to be very efficient, due to its ease and also to the excellent properties of the crosslinked polymer obtained, especially the alignment stability of the chromophores and its filmability.

This novel process is based on the use of azide and alkyne (also known as ethynyl) functions that can react together, at a temperature above room temperature depending on the nature of the surrounding groups, to form a triazole according to the following principle:

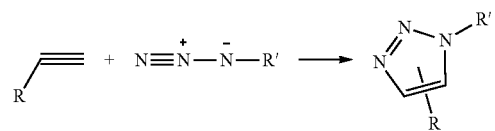

Thus, in accordance with the process of the invention, at least one azide function and at least one alkyne function are present on at least one from among the polymer or precursor thereof.

According to one advantageous embodiment, in the process in accordance with the invention, the azide function and/or the alkyne function is (are) present on the chromophoric groups and/or on the polymer chain, or alternatively on an associated dopant.

In the present patent application, the term "chromophoric group" means a molecule having at least one free valency, of nonzero quadratic hyperpolarizability, which may be a compound of "push-pull" type and which more particularly has a D-Π-A structure, in which D is an electron donor, A is an electron acceptor and Π is a Π bridge that conjugates the donor to the acceptor. A "donor" (represented by "D") is an atom or group of atoms with low electron affinity for the acceptor, such that when the donor is conjugated to the acceptor via a Π bridge, the electron density is transferred from the donor to the acceptor.

An "acceptor" (represented by "A") is an atom or group of atoms with high electron affinity for the donor, such that when the acceptor is conjugated to the donor via a Π bridge, the electron density is transferred from the acceptor to the donor.

A "Π bridge" is composed of an atom or group of atoms through which electrons may be delocalized from a donor to an acceptor via the orbitals of the atoms of the bridge. Preferably, the orbitals are the p orbitals of multiply-bonded carbon atoms, for instance those of alkenes, alkynes, neutral or charged aromatic nuclei, or cyclic systems comprising heteroatoms.

Examples of chromophoric groups that may be mentioned include Disperse Red One (DR1), CLD, FTC, RHSC, PCTCN, TMC and TM.

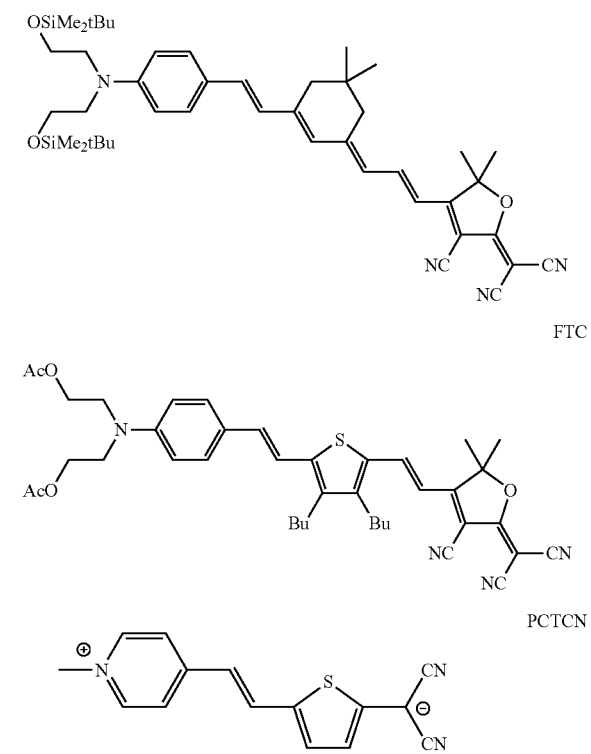

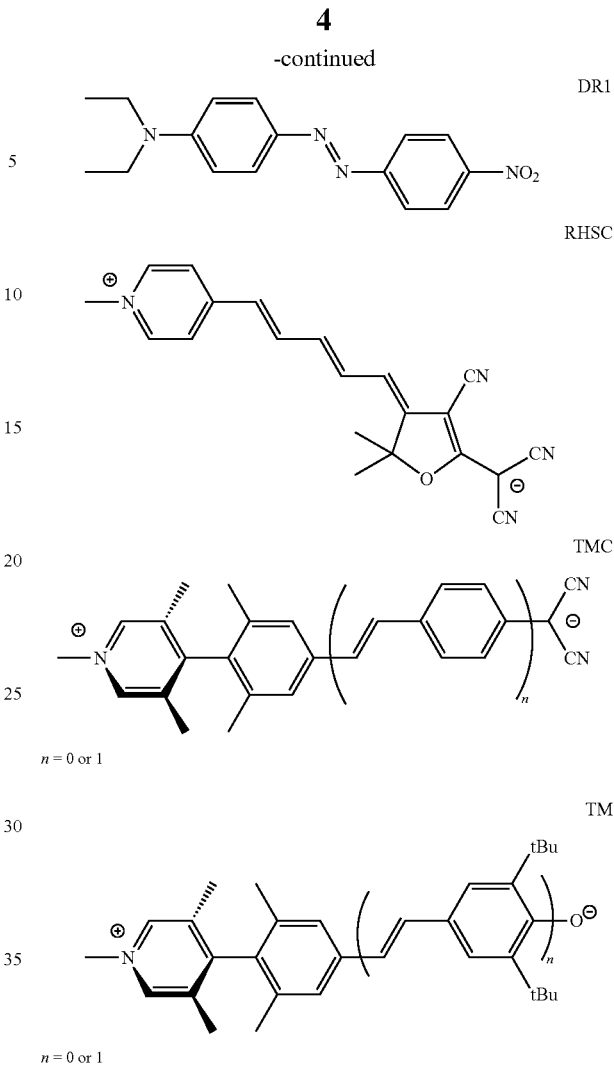

The term "polymers" means any molecule formed from monomers covalently bonded together. The monomers, which are optionally substituted, are referred to as "precursors" of said polymers. In the present patent application, this term "polymers" denotes, without preference, homopolymers, copolymers and dendrimers. Examples of constituent monomers that may be mentioned include vinyl, acrylic and methacrylic monomers. Needless to say, the polymers may be substituted. If they are substituted with a chromophoric group, these polymers are known as chromophoric polymers. The monomers and substituted monomers are the precursors of the polymers. Monomers substituted with a chromophoric group are known as "chromophoric groups" or "chromophores".

According to one advantageous embodiment, in the process of the invention, the polymer has a main chain based on monomers chosen from the group comprising acrylic, methacrylic and vinyl monomers, and mixtures thereof.

The chromophoric group may bear the azide function or the alkyne function. However, according to another embodiment, at least one of these functions may be borne by the polymer or a precursor thereof.

Thus, the process in accordance with the invention may use the various following reaction schemes:

Scheme 1:
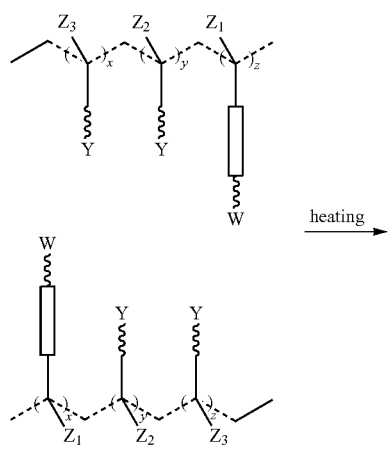
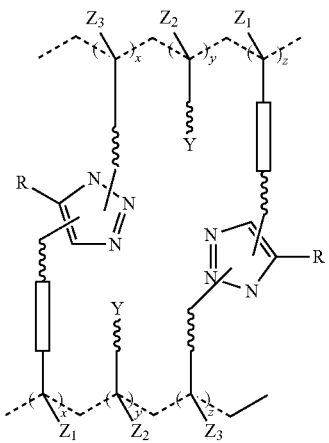
Scheme 2
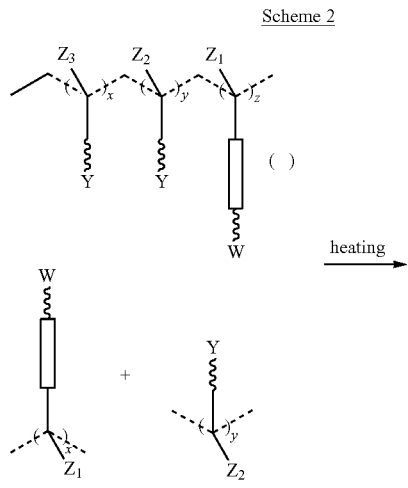
-continued
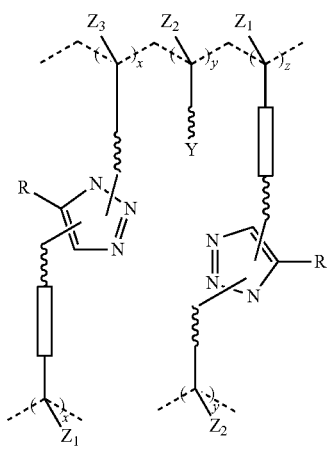
Scheme 3:
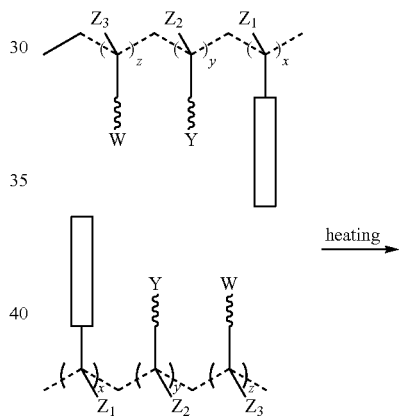
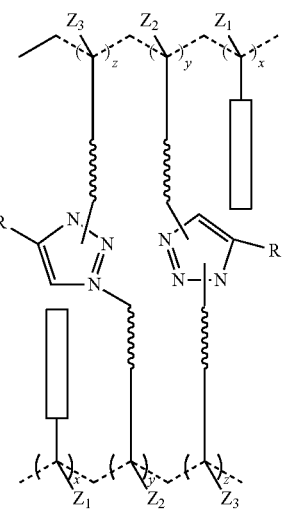

Scheme 4:
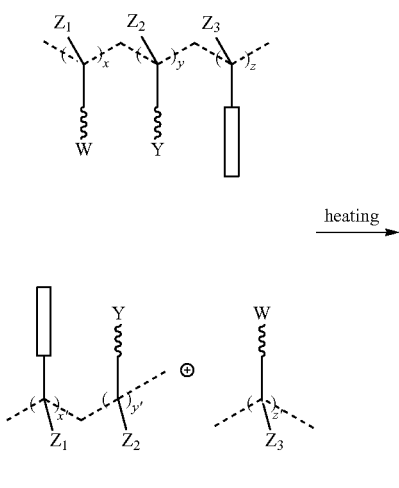
Scheme 5:
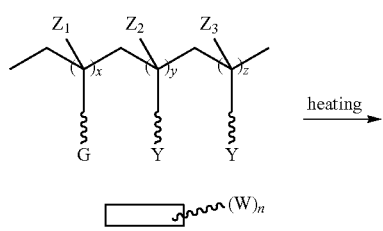
Scheme 6:
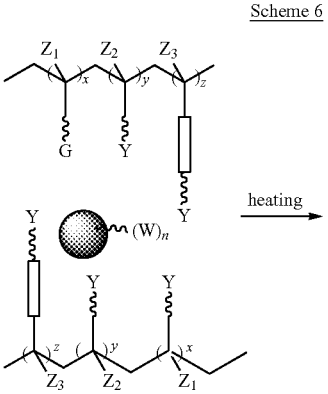
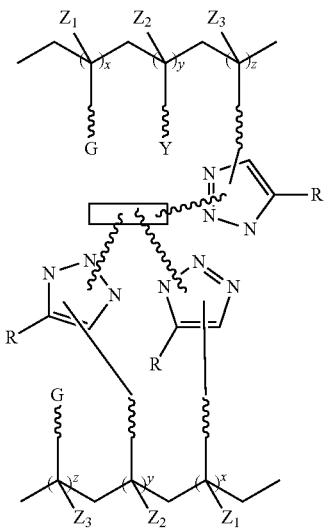
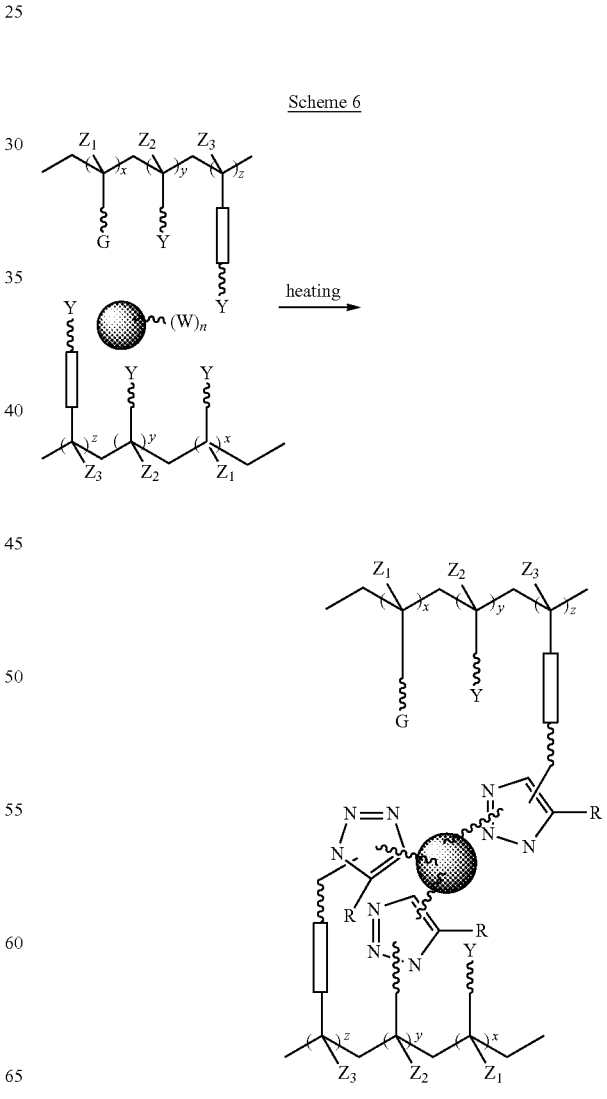

Scheme 7

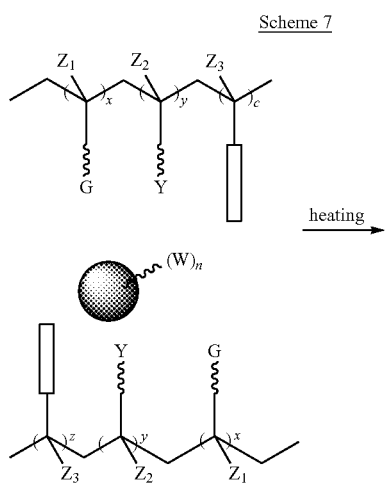

in which:

represents a chromophore with nonzero quadratic hyperpolarizability;

$Z_1$, $Z_2$ and $Z_3$ represent, independently of each other, H, $C_1$-$C_4$ alkyl or phenyl;

G is a group that is neutral towards crosslinking;

is any chemical species;

n is an integer greater than 1;

-∿∿∿- represents a connector;

represents the repeating unit of the polymer;

x, y, z, x', y' and z' represent, independently of each other, an integer between 0 and 100, preferably between 2 and 50 and even more preferentially between 3 and 10, it being understood that in each of the reaction schemes, two from among x, y, z and two from among x', y' and z' are nonzero, W and Y are such that when Y represents $N_3$, then W represents

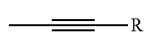——R and when W represents $N_3$, then Y represents

——R,

R being chosen from the group comprising H, a linear, branched or cyclic, saturated or unsaturated hydrocarbon-based chain, optionally containing aromatic units optionally comprising heteroatoms such as O, S and N, and optionally substituted with electron-donating groups such as —$OCH_3$, —N(alkyl)$_2$ or with electron-accepting groups such as —CN, —$CO_2$alkyl, —$NO_2$, R may also represent a protecting group for an ethylyne function. Protecting groups for the ethylyne function that may be mentioned include an alkylsilyl, an arylsilyl, or alkylarylsilyl, preferably trimethylsilyl, triisopropylsilyl, dimethyl-tert-butylsilyl, diphenyl-tert-butylsilyl and terphenylsilyl.

In the present patent application, the term "alkyl" means any linear, branched or cyclic carbonyl chain containing from 1 to 20 carbon atoms, preferably from 1 to 8 carbon atoms and even more preferentially 1 to 4 carbon atoms, such as ethyl, methyl, i-propyl, n-propyl, i-butyl, tert-butyl or n-butyl. The alkyl may be substituted.

Any atom or chemical group that does not participate in the crosslinking reaction, for example hydrogen or unsaturated alkyl groups, in particular methyl, may be used as neutral group G.

may represent any chemical species that can be functionalized with n functions W. Examples of such species that may be mentioned include a phenyl, a trimethylphenyl and a tetraphenylmethyl.

Thus,

which will also be referred to as a dopant, may represent, for example,

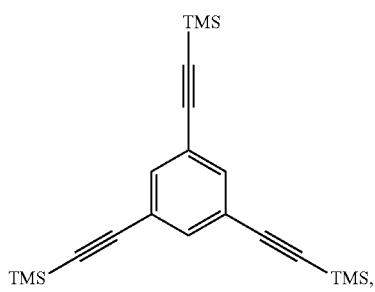

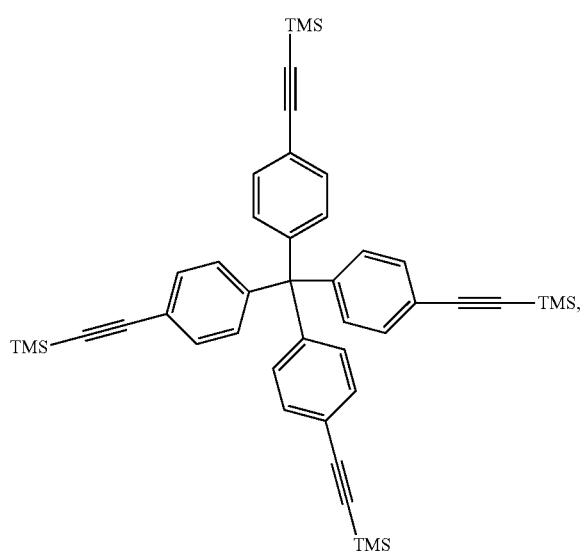

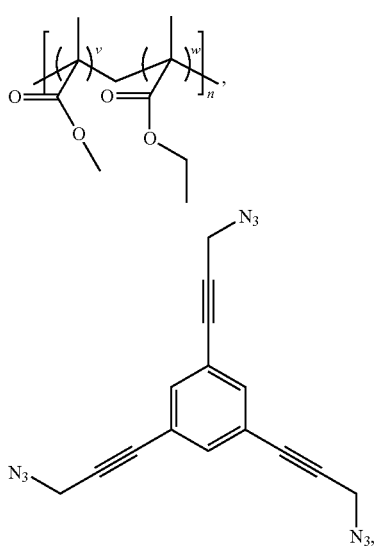

v and w being integers greater than or equal to 1.

The azide function and likewise the alkyne function may be introduced onto the chromophore, onto the polymer or onto a polymer precursor via a coupling reaction. For example, the azide function may be introduced by coupling an acid function of the chromophore, of the polymer or of a precursor thereof with an azidoaniline. The ethylyne function may be introduced by coupling an acid function of the chromophore, of the polymer or of a precursor thereof with trimethylsilyl-propargyl alcohol.

The connector is a divalent group of variable structure as a function of the groups that it connects. Preferably, the connector has a rigid structure. In particular, the connector may be chosen from the group comprising a linear or cyclic aliphatic chain, possibly containing heteroatoms, and an aromatic chain possibly containing heteroatoms. Examples that may be mentioned include C1-C4 and preferably C2-C4 saturated alkyl chains, a benzene nucleus, adamantyl, thiophene, pyridine, pyrrole, norbornyl, a sugar residue, etc.

According to one advantageous embodiment, it is possible, on the one hand, to attach the chromophoric group to a monomer using standard coupling methods, and, on the other hand, to attach the azide function or the ethylyne function to another monomer, for example via a connector. The various monomers are then polymerized. When the polymer is formed, it is subjected to the thermal Huisgen reaction.

According to another advantageous embodiment, it is possible, on the one hand, to attach the chromophoric group to a monomer using standard coupling methods and then to couple the azide function (or the ethylyne function) with the chromophoric group, and, on the other hand, to attach the ethylyne function (or the azide function) to another monomer, for example via a connector. The two types of monomer are then copolymerized. When the polymer is formed, it is subjected to the thermal Huisgen reaction.

The monomers are polymerized according to the standard method[24] (thermal decomposition of azobisisobutyronitrile—AIBN—in an organic solvent) or by living polymerization according to the Reversible Addition-Fragmentation Chain Transfer[22,25] (RAFT) polymerization technique or by Atom Transfer Radical Polymerization[23,26] (ATRP).

In the process in accordance with the invention, the crosslinking by Huisgen reaction is performed at a temperature in the order of the glass transition temperature of the polymer. This temperature is generally from 120° to 200° C., preferably from 130° to 170° C. and even more preferentially about 150° C. This crosslinking is performed in the absence of catalyst. The polymer to be crosslinked is maintained at the crosslinking temperature throughout the time necessary for complete crosslinking. Determination of the end of crosslinking is within the capability of a person skilled in the art and may be made by any analytical method. In particular, mention may be made of IR monitoring of the presence of a vibration at about 2100 cm$^{-1}$, which is the vibration specific to azides.

In general, it may be indicated that the crosslinking time is from 30 minutes to 2 hours, preferably from 45 minutes to 1 hour 30 minutes and even more preferentially about 1 hour.

The invention also relates to heat-crosslinkable chromophoric polymers, of general formulae (I) to (IV):

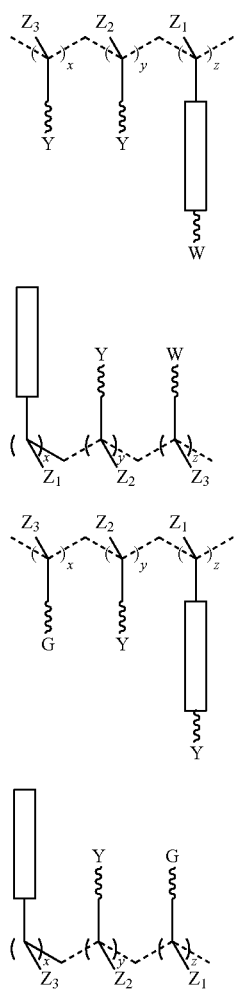

(I)

(II)

(III)

(IV)

the various components having the same meanings as those given in relation with the reaction schemes.

By modifying the structure of the monomers, it is possible to finely adjust the functional properties of the polymer, such as its refractive index.

According to one advantageous embodiment, the polymer of formula (I) is chosen from the group comprising:

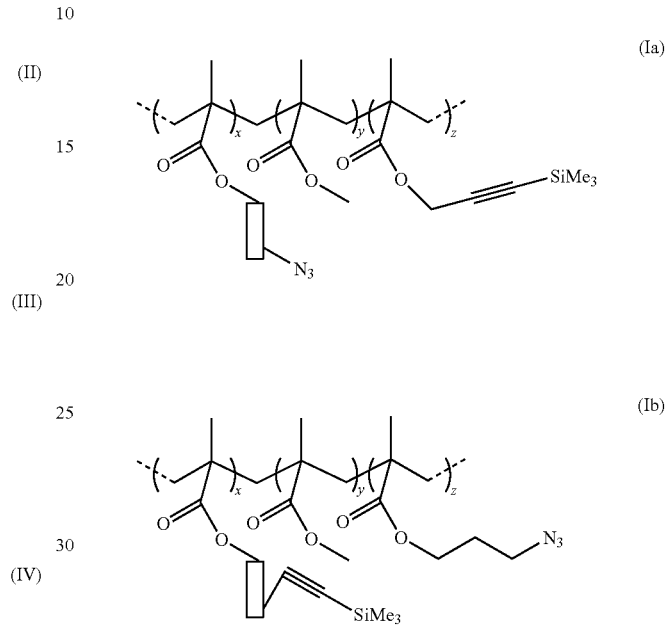

(Ia)

(Ib)

The various radicals have the same meanings as previously.

Examples of such polymers according to the invention whose monomer is of methacrylic type and whose chromophore is a Disperse Red One (DR1) derivative, have the formulae (I' a) and (I' b) below:

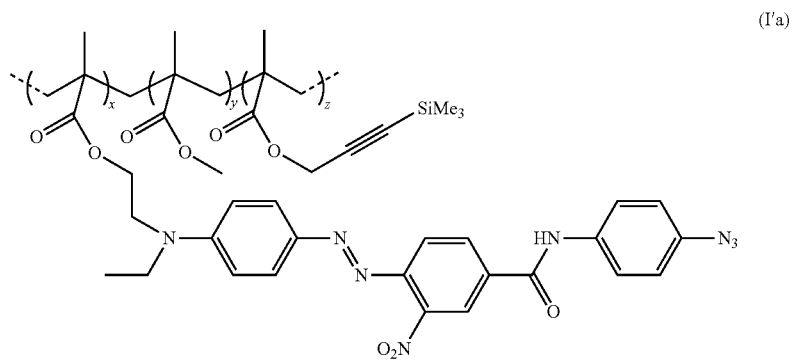

(I'a)

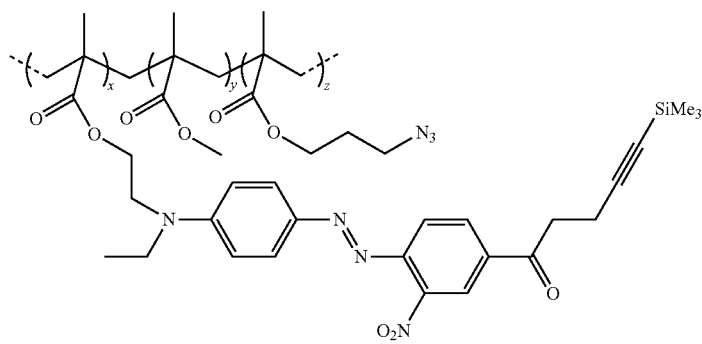

with x, y and z representing, independently of each other, an integer between 0 and 7, it being understood that only one from among x, y and z may represent 0; preferably, the combinations of x, y and z being chosen from the group comprising:

x=3, y=3 and z=4 and x=3, y=0 and z=7.

An example of a polymer of formula (III) that may be mentioned is the polymer having the following formula:

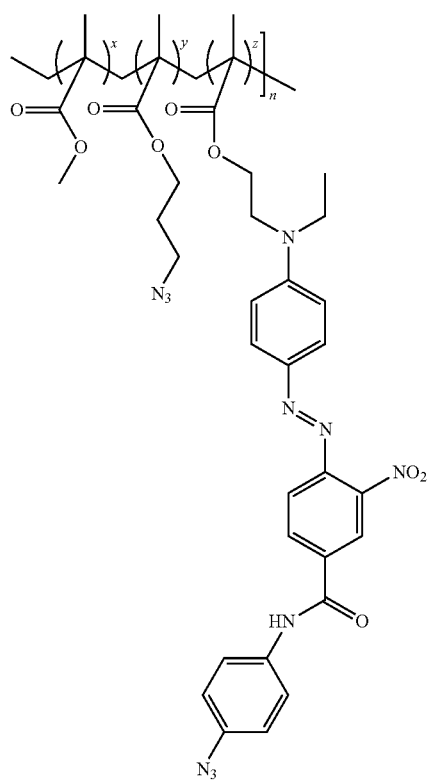

This polymer may be crosslinked by thermal Huisgen reaction, according to scheme 6 mentioned above, using one or other of the following products (dopants):

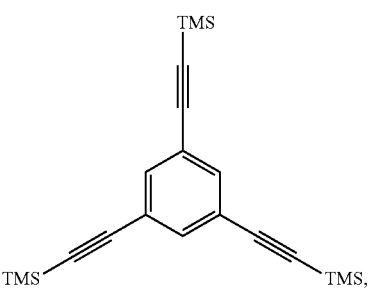

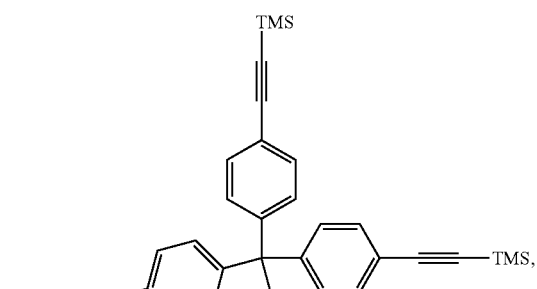

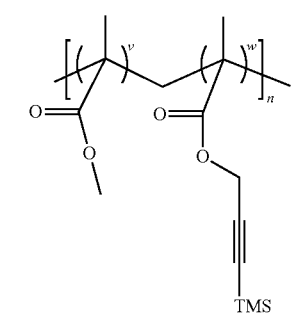

An example of a polymer of formula (IV) that may be mentioned is the polymer having the following formula:

This polymer may be crosslinked by thermal Huisgen reaction, according to scheme 7 mentioned above, using one or other of the following products (dopants):

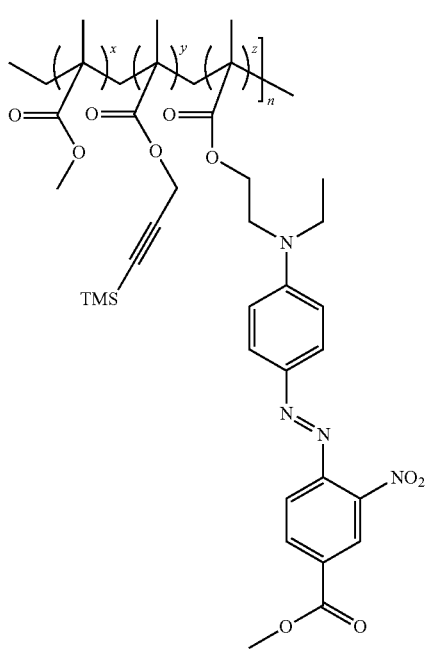

An example of implementation of the crosslinking according to reaction scheme 5 consists in reacting the following two products:

The crosslinkable polymers of the invention are highly soluble and film-forming and highly adherent to the substrate, since monolayer films thicker than a micrometer are obtained in a single step by centrifugal induction on a glass or silicon support.

In order to be used as electrooptic materials, these polymers must be oriented before being crosslinked.

Thus, according to one advantageous embodiment of the process in accordance with the invention, in the case of electrooptic materials, the polymerization by Huisgen reaction is performed after formation of a polymer film and orientation of the chromophores.

Such a process is characterized in that the polymer is subjected to the following successive steps:
- formation of a film,
- orientation of the chromophores, and
- crosslinking.

The polymer used in this process is a polymer having one of the formulae (I) to (IV) above.

In the embodiments using a process according to one of schemes 5 to 7, the material is formed from a mixture of two different products that are combined in a common solvent just before the step of preparing the film. The relative proportion of the two products may cover a relatively wide range; preferably, the amounts will be adjusted such that the ratio Y/W is greater than or equal to 1. The approaches presented in schemes 5-7 offer the advantage of keeping the crosslinking functions (Y and W) separate from each other and thus of increasing the stability on storage of the materials before the preparation of the films.

The formation of the polymer film is performed conventionally by centrifugal induction (spin coating) on a support, preferably a glass or silicon support. This step is generally followed by annealing.

Orientation of the chromophores (poling) is performed either using a pulsed field or using a conductive wire that is subjected to an electrical voltage and placed over the film.

The step of orienting the chromophores and of crosslinking includes the following stages:
1. heating the film to a temperature T1;
2. applying a voltage V between the film and a conductive wire placed a distance d above the film, while keeping the temperature at the value T1 for a time D1;
3. heating and maintaining the film at a temperature T2 for a time D2 while maintaining the electrical voltage;
4. cooling to room temperature, while maintaining the electrical voltage;

T1 being around the glass transition temperature (Tg) of the polymer;
V being between 10 V and 8 kV, preferably between 2 kV and 4 kV and even more preferentially about 3.5 kV;
d being between 1 and 15 mm, preferably between 2 and 10 mm and even more preferentially about 5 mm;
T2 is between 120 and 200° C., preferably between 130 and 170° C. and even more preferentially about 150° C.;
the times D1 and D2 being, independently of each other, between 30 minutes and 2 hours, preferably between 45 minutes and 1 hour 30 minutes and even more preferentially about 1 hour.

The expression "T1 being around the glass transition temperature (Tg) of the polymer" means at a temperature that is about 25° C. higher or lower than the Tg, preferably about 20° C. higher or lower than the Tg and even more preferentially about 10° C. higher or lower than the Tg.

The step of forming the film is performed with a solution of the polymer in a solvent chosen from the group comprising a halogenated solvent, preferably a chlorinated solvent and even more preferentially trichloroethane or ortho-dichlorobenzene; N-methyl-pyrrolidone; THF; and mixtures thereof.

The annealing is performed at a temperature ranged from 40 to 80° C., preferably from 50 to 70° C. and even more preferentially about 60° C., for a time of 30 minutes to 2 hours, preferably from 45 minutes to 1 hour 30 minutes and even more preferentially about 1 hour.

The crosslinking temperature is obviously significantly modulable by modifying the substituent on the alkyne group. For example, replacing the trimethylsilyl group with a methyl group makes it possible to increase the crosslinking temperature very significantly, whereas replacing it with a hydrogen allows it to be decreased.

The invention also relates to a polymerized material crosslinked according to the process described previously, which has orientation stability of the chromophores such that the reduction in the nonlinear optical property is less than 5% after maintaining said material for 1000 hours at a temperature of 85° C.

The glass transition temperature Tg of the crosslinked material is at least 10° C., preferably at least 20° C. and even more preferentially at least 25° C. higher than that of the polymer from which it was obtained. These materials are insoluble in standard solvents such as THF or halogenated solvents, especially chlorinated solvents, such as ortho-dichlorobenzene.

The films of polymerized crosslinked material according to the process of the invention have a thickness (e) of between 0.1 and 5 μm, preferably from 0.5 to 3 μm and more preferentially from 1 to 2 μm. Although they have a large thickness, they have good optical quality. Second Harmonic Generation measurements of these films have shown that these polymers effectively have relatively high electrooptic coefficients ($r_{33}$) given by their concentrations of chromophores.

The electrooptic coefficient $r_{33}$ of the polymerized material crosslinked according to the invention is, entirely advantageously, independent of its thickness (e). This property is relatively uncommon since the orientation efficacy generally decreases with the thickness. The chromophores here become oriented in a relatively cooperative manner, with regard to the orientation process, since the yield of the orientation step varies slightly with the thickness of the films. This point is important since the coupling of an optical fiber to a polymer waveguide requires a significant thickness in order not to give rise to excessive energy losses.

Given their ease of preparation starting from cheap commercial precursors, the high filmability of the polymers before crosslinking and the good orientation stabilization of the chromophores obtained by crosslinking, the polymerized material crosslinked according to the invention is entirely suitable for applications in optical telecommunications and optical signal processing.

The present invention will be described in greater detail with the aid of the examples that follow, which are given purely as illustrations and shall not limit the scope thereof.

EXAMPLES

Example 1

Preparation of DR1-PhN3 of Formula

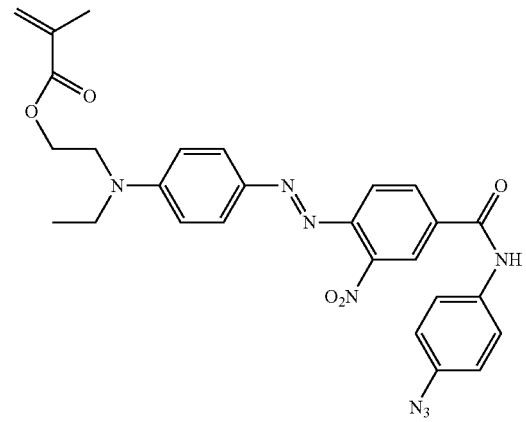

DR1-PhN3

N-Methylmorpholine (V=0.77 ml, 7.04 mmol, 3 eq.) and then (4-(4,6-dimethoxy-1,3,5-triazin-2-yl)-4-methyl-morpholine) chloride (779 mg, 2.81 mmol, 1.2 eq.) are added to a solution of 4'-[N-(2-methacryloxyethyl)-N-ethyl]amino-2-nitro-4-carboxyazobenzene (1 g, 2.346 mmol, 1 eq.) and 4-azidoaniline (440 mg, 2.58 mmol, 1.1 eq.) in THF (V=5 ml). The solution is stirred for 12 hours at room temperature protected from light. The solvent is then evaporated off under reduced pressure to give the crude product which is purified by chromatography on silica gel with dichloromethane as eluent to give 1.35 g of desired product (100%).

$^1$H NMR (300 MHz, CDCl$_3$), δ(ppm): 8.32 (d, 1H, J=1.8 Hz); 8.10 (dd, 1H, J=8.4 Hz, J=2.1 Hz); 7.87 (d, 2H, J=9.3 Hz); 7.83 (d, 2H, J=8.4 Hz); 7.67 (d, 2H, J=9 Hz); 7.06 (d, 2H, J=9 Hz); 6.80 (d, 2H, J=9.3 Hz); 6.10 (s, 1H); 5.59 (s, 1H); 4.37 (t, 2H, J=6.6 Hz); 3.73 (t, 2H, J=6 Hz); 3.53 (q, 4H, J=6.9 Hz); 1.94 (s, 3H); 1.26 (t, 3H, J=7.2 Hz).

$^{13}$C NMR (75 MHz, CDCl$_3$), δ (ppm): 164.68; 151.80; 146.88; 143.39; 136.62; 135.83; 134.39; 134.27; 131.28;

126.98; 126.33; 122.70; 121.94; 119.69; 119.27; 113.97; 111.55; 61.65; 48.80; 21.76; 18.33; 12.28.

EI-MS: m/$z_{th}$=542.2; m/$z_{exp}$=543.1 (MH⁺; 100%); 515.1 (23%); 382.2 (27%).

UV-V is: $\lambda_{max}$ (CH$_2$Cl$_2$) ($\in$(mol⁻¹ L cm⁻¹))=480 (28 200).

FT-IR (KBr, cm⁻¹): 2967 ($v_{st(CH2)}$); 2114 ($v_{st(N3)}$); 1717 ($v_{st(C=O)}$); 1676, 1598 ($v_{st(C=C)}$).

Example 2

Preparation of DR1-TMS of Formula

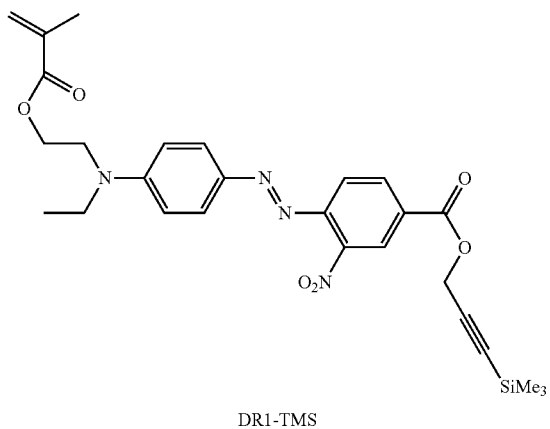 [SMILES: C=C(C)C(=O)OCCN(CC)c1ccc(/N=N/c2ccc(C(=O)OCC#C[Si](C)(C)C)cc2[N+](=O)[O-])cc1 ; "DR1-TMS"]

DR1-TMS

N-Methylmorpholine (V=0.77 ml, 7.04 mmol, 3 eq.) and then (4-(4,6-dimethoxy-1,3,5-triazin-2-yl)-4-methyl-morpholine) chloride (779 mg, 2.81 mmol, 1.2 eq.) are added to a solution of 4'-[N-(2-methacryloxyethyl)-N-ethyl]amino-2-nitro-4-carboxyazobenzene (1 g, 2.346 mmol, 1 eq.) and trimethylsilylpropargyl alcohol (0.38 ml, 2.58 mmol, 1.1 eq.) in THF (V=5 ml). The solution is stirred for 12 hours at room temperature protected from light. The solvent is then evaporated off under reduced pressure to give the crude product, which is purified by chromatography on silica gel with a dichloro-methane/petroleum ether mixture (8/2) as eluent to give 1.64 g of desired product (95%).

¹H NMR (300 MHz, CDCl$_3$), δ (ppm): 8.51 (d, 1H, J=1.5 Hz); 8.26 (dd, 1H, J=8.7 Hz, J=1.5 Hz); 7.87 (d, 2H, J=9.3 Hz); 7.77 (d, 1H, J=8.7 Hz); 6.80 (d, 2H, J=9.3 Hz); 6.10 (s, 1H); 5.59 (s, 1H); 4.97 (s, 2H); 4.49 (t, 2H, J=5.4 Hz); 4.37 (t, 2H, J=6.3 Hz); 3.73 (t, 2H, J=6 Hz); 3.55 (q, 2H, J=7.2 Hz); 1.93 (s, 3H); 1.25 (t, 3H, J=6.9 Hz).

¹³C NMR (75 MHz, CDCl$_3$), δ (ppm): 151.96; 148.81; 144.34; 135.97; 133.83; 129.46; 129.00; 127.14; 126.47; 125.68; 118.89; 111.69; 98.44; 94.78; 93.16; 65.93; 61.79; 54.06; 48.94; 45.84; 18.49; 12.42; −0.18.

EI-MS: m/$z_{th}$=536.2; m/$z_{exp}$=537.3 (MH⁺).

UV-V is: $\lambda_{max}$ (CH$_2$Cl$_2$) ($\in$(mol⁻¹ L cm⁻¹))=482 (31 600).

FT-IR (KBr, cm⁻¹): 2968 ($v_{st(CH2)}$); 2186 ($v_{st(C=C)}$); 1717 ($v_{st(C=O)}$); 1676, 1598 ($v_{st(C=C)}$).

Example 3

Preparation of Polymers

Two polymers of formula (Ia) (designated as AS470 and AS472) and two polymers of formula (Ib) (designated as AS475 and AS473) were prepared according to the following protocol. Their respective formulae are given in FIG. 1.

The various reagents (monomers whose nature and amount is given in Table 1) and radical initiator AIBN (azobisisobutyronitrile) (0.03 eq.) are introduced at room temperature into a Schlenck tube under argon, predried under vacuum, and the mixture is degassed by successive cycles of freezing/vacuum/thawing, so as to remove all trace of oxygen, and the mixture is then placed under an argon atmosphere. The reaction mixture is maintained at a temperature of 70° C. with stirring for 18 hours protected from light. After cooling to room temperature, the product is precipitated from methanol (10 vol. eq.) and the polymer is then washed and isolated by centrifugation.

The following yields were obtained:
75% for AS470, 50% for AS472, 52% for AS473 and 79% for AS475.

The number-average molecular mass and the polydispersity index were determined by steric exclusion chromatography using polystyrene as reference, to give:

for AS470: Mn=7600; Ip=1.8 for AS472: Mn=7100; Ip=1.9 for AS473: Mn=18 600; Ip=1.4 for AS475: Mn=13 400; Ip=1.4.

For each of these polymers, the glass transition temperature was measured by DSC and the results are given in Table 1 below.

For comparative purposes, the properties of a known crosslinking system were also studied. This is the polymer PIII developed by Bosc et al. based on the reaction of an epoxide with a carboxylic acid function.[12]

The same parameters as those measured for the polymers of the invention were measured for the polymer PIII. The results are also given in Table 1.

Example 4

Preparation of Films and Crosslinking 5 different films were prepared separately, using the same protocol, each with polymers prepared in Example 3.

A solution containing 250 g/L of polymer in ortho-dichlorobenzene predistilled over CaH$_2$ was prepared. After filtration through a PVDF (polyvinylidene difluoride) membrane with a pore diameter of 0.2 μm, this solution is deposited on a cleaned and dried glass substrate. Homogeneous films are obtained by centrifugal induction followed by annealing at 60° C. for 1 hour. These films are then oriented and crosslinked in four steps: first, they are heated to 90° C. (10° C. above the Tg); when this temperature is reached, a voltage of 3.5 kV is then applied between the film and a tungsten wire placed 5 mm above the film. This voltage is maintained for 1 hour at 90° C. and then, in a third step, the film is heated at 150° C. for a further 1 hour so as to perform complete crosslinking of the polymer. Finally, to set the orientation of the chromophores, the film is cooled to room temperature while maintaining the electric field.

Example 5

For each of the films obtained in Example 4, the thickness of the film, the crosslinking temperature by DSC at the maximum of the exothermic peak, and the electrooptic coefficient $r_{33}$ at 1064 nm were determined. The various results are collated in Table 1 below.

TABLE 1

| Polymer | x, y, z | Mn (g/mol) | Ip | Tg (° C.) | $T_{crosslinking}$ (° C.) | Thickness (μm) | $r_{33}$ (pm/V) |
|---|---|---|---|---|---|---|---|
| AS470, Formula Ia | 3, 3, 4 | 7 600 | 1.8 | 75 | 166 | 2.7 | 13.3 |
| AS472, Formula Ia | 3, 0, 7 | 7 100 | 1.9 | 77 | 168 | 2.2 | 14.7 |
| AS475, Formula Ib | 3, 3, 4 | 13 400 | 1.4 | 69 | 164 | 1.2 | 15.7 |
| AS473, Formula Ib | 3, 0, 7 | 18 600 | 1.4 | 72 | 168 | 1.7 | 14 |
| PIII (comparative) | 3, 7 | 2 900 | 1.3 | 65 | 150 | 0.8 | 16 | for formula Ia: x = $DR_1$-$PhN_3$, y = PMMA, z = PMA-TMS
for formula Ib: x = $DR_1$-TMS, y = PMMA, z = PMA-$N_3$

Example 6

Checking of the Crosslinking

The polymer AS475 as prepared in Example 3 was applied as a film by spin coating. This film was soluble in THF and ortho-dichlorobenzene.

The intensity of the IR band of the $N_3$ vibrator located at about 2100 cm$^{-1}$ was monitored during heating at 160° C. The results are given in FIG. 2.

An attempt was then made to dissolve the crosslinked film in THF and in ortho-dichlorobenzene, but this film did not dissolve in these solvents.

FIG. 2 is a diagram representing the IR spectra, between 2225 and 2025 cm$^{-1}$, of polymer AS475. The "initial curve" represents the IR spectrum at time to, i.e. at room temperature, and the "final curve" represents the IR spectrum at time tf (tf=36 min.), i.e. when the temperature reaches 160° C. The other curves are IR spectra obtained at intermediate temperatures.

It emerges from this figure that the IR band of the $N_3$ vibrator disappears on heating, thus demonstrating the crosslinking of the polymer AS475.

Example 7

Polymer AS472 as prepared in Example 3 was subjected to differential scanning calorimetry (DSC) analysis shown in FIG. 3. This analysis shows the intervention of an exothermic process at and above 120° C., the maximum being at 160° C. This phenomenon corresponds to the Huisgen 1,3-cycloaddition reaction. The characterization of this reaction was confirmed by identification of the products of this chemical transformation by heating model compounds in solution (results not shown).

Moreover, polymer AS472, which is initially soluble in the usual organic solvents (THF or ortho-dichlorobenzene, inter alia), becomes insoluble after crosslinking.

Example 8

The signal for Second Harmonic Generation as a function of the temperature of the oriented but non-crosslinked film of polymer AS472, of the oriented and crosslinked film of polymer AS472 obtained in Example 4 and of the oriented and crosslinked polymer PIII was monitored.

The relative value of $r_{33}$ was reported for each polymer during a temperature rise from 40 to 120° C. at a rate of 2° C./minute. The results are presented in FIG. 4.

Figure 4:
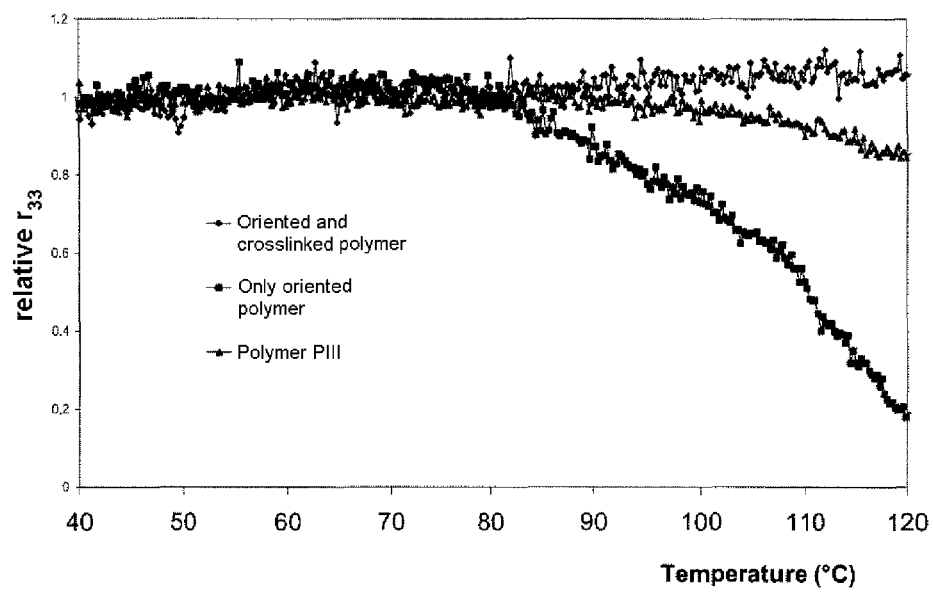

It emerges from FIG. 4 that the signal for the crosslinked film AS472 does not undergo any loss up to a temperature of 120° C., whereas that of the same non-crosslinked polymer falls at and above 100° C., for the same concentration of chromophore. The electrooptic response of a competitive polymer (PIII) begins to fall significantly at and above a temperature of 100° C.[12]

The crosslinked polymer thus shows very good orientation stability of the chromophores.

REFERENCES (1) Lee, M., "Dielectric constant and loss tangent in $LiNbO_3$ crystals from 90 to 147 GHz", *Appl. Phys. Lett.* 2001, 79, 1342-1344.

(2) Kang, H.; Facchetti, A.; Jiang, H.; Cariati, E.; Righetto, S.; Ugo, R.; Zuccaccia, C.; Macchioni, A.; Stem, C. L.; Liu, Z.; Ho, S.-T.; Brown, E. C.; Ratner, M. A.; Marks, T. J., "Ultralarge Hyperpolarizability Twisted-Electron System Electro-Optic Chromophores: Synthesis, Solid-State and Solution-Phase Structural Characteristics, Electronic Structures, Linear and Nonlinear Optical Properties, and Computational Studies", *J. Am. Chem. Soc.* 2007, 129, 3267-3286.

(3) Enami, Y.; Derose, C. T.; Mathine, D.; Loychik, C.; Greenlee, C.; Norwood, R. A.; Kim, T. D.; Luo, J.; Tian, Y.; Jen, A. K. Y.; Peyghambarian, N., "Hybrid polymer/sol-gel waveguide modulations with exceptionally large electro-optic coefficients", *Nature Photonics* 2007, 1, 423.

(4) Luo, J.; Huang, S.; Cheng, Y.-J.; Kim, T.-D.; Shi, Z.; Zhou, X.-H.; Jen, A. K. Y., "Phenyltetraene-Based Nonlinear Optical Chromophores with Enhanced Chemical Stability and Electrooptic Activity", *Org. Lett.* 2007, 9, 4471-4474.

(5) Jen, A.; Luo, J.; Kim, T.-D.; Chen, B.; Jang, S.-H.; Kang, J.-W.; Tucker, N. M.; Hau, S.; Tian, Y.; Ka, J.-W.; Haller, M.; Liao, Y.; Robinson, B.; Dalton, L.; Herman, W., "Exceptional electro-optic properties through molecular design and controlled self-assembly", *Proc. SPIE* 2005, 5935, 593506/593501-593506/593513; Dalton, L.; Robinson, B.; Jen, A.; Ried, P.; Eichinger, B.; Sullivan, P.; Akelaitis, A.; Bale, D.; Haller, M.; Luo, J.; Liu, S.; Liao, Y.; Firestone, K.; Bhatambrekar, N.; Bhattacharjee, S.; Sinness, J.; Hammond, S.; Buker, N.; Snoeberger, R.; Lingwood, M.; Rommel, H.; Amend, J.; Jang, S.-H.; Chen, A.; Steier, W., "Electro-optic coefficients of 500 pm/V and beyond for organic materials", *Proc. SPIE* 2005, 5935, 593502/593501-593502/593512.

(6) Dalton, L. R.; Steier, W. H.; Robinson, B. H.; Zhang, C.; Ren, A.; Garner, S.; Chen, A.; Londergan, T.; Irwin, L.; Carlson, B.; Fifield, L.; Phelan, G.; Kincaid, C.; Amend, J.; Jen, A., "From molecules to opto-chips: organic electrooptic materials", *J. Mater. Chem.* 1999, 9, 1905-1920.

(7) Burland, D. M.; Miller, R. D.; Walsh, C. A., "Second-order nonlinearity in poled-polymer systems", *Chem. Rev.* 1994, 94, 31-75.

(8) Haller, M.; Luo, J.; Li, H.; Kim, T.-D.; Liao, Y.; Robinson, B. H.; Dalton, L. R.; Jen, A. K. Y., "A Novel Lattice-Hardening Process To Achieve Highly Efficient and Thermally Stable Nonlinear Optical Polymers", *Macromolecules* 2004, 37, 688-690; Jen, K.-y.; Dalton, L. R.; Luo, J.; Haller, M. "Reversible crosslinking method for making an electro-optic polymer," patent PCT Int. Appl. WO 2004065615, (University of Washington, USA). 2004.

(9) Huang, D. "Crosslinkable side-chain polyimides for NLO applications," patent U.S. Pat. Appl. Publ. USA 2006049387, (Usa). 2006; Ma, H.; Chen, B.; Sassa, T.; Dalton, L. R.; Jen, A. K. Y., "Highly Efficient and Thermally Stable Nonlinear Optical Dendrimer for Electrooptics", *J. Am. Chem. Soc.* 2001, 123, 986-987; Zhang, C.; Fetterman, H. R.; Steier, W.; Michael, J. "Polymers containing polyene-bridged second-order nonlinear optical chromophores and devices incorporating the same," patent PCT Int. Appl. Wo 2002029488, (Pacific Wave Industries, Inc., USA). 2002; Luo, J.; Haller, M.; Ma, H. L., S.; Kim, T.-D.; Tian, Y.; Chen, B.; Jang, S.-H.; Dalton, L. R.; Jen, A. K.-Y., "Nanoscale Architectural Control and Macromolecular Engineering of Nonlinear Optical Dendrimers and Polymers for Electro-Optics", *J. Phys. Chem. B* 2004, 108, 8523-8530.

(10) Kuang, L.; Gao, J. P.; Wang, Z. Y. "Photo-reactive benzocyclobutenones and polymers therefrom for self-photo-curing, photo-crosslinking and photopatterning without catalysts," patent Can. Pat. Appl. Ca 2346149, (Carleton University, Can.). 2001.

(11) Bai, Y.; Song, N.; Gao, J. P.; Sun, X.; Wang, X.; Yu, G.; Wang, Z. Y., "A New Approach to Highly Electrooptically Active Materials Using Cross-Linkable, Hyperbranched Chromophore-Containing Oligomers as a Macromolecular Dopant", *J. Am. Chem. Soc.* 2005, 127, 2060-2061.

(12) Bosc, D.; Foll, F.; Boutevin, B.; Rousseau, A., "Synthesis of a novel difunctional NLO azo-dye chromophore and characterizations of crosslinkable copolymers with stable electrooptic properties", *J. Appl. Polym. Sci.* 1999, 74, 974-982; Foll, F.; Bosc, D.; Liang, J.; Rousseau, A.; Boutevin, B. "Preparation of curable polymers for use in nonlinear optical devices," patent Eur. Pat. Appl. EP 641808, (France Telecom, Fr.). 1995.

(13) Levenson, R.; Liang, J.; Rossier, C.; Hierle, R.; Toussaere, E.; Bouadma, N.; Zyss, J., "Advances in organic polymer-based optoelectronics", *ACS Symposium Series* 1995, 601, 436-455; Luo, J.; Haller, M.; Li, H.; Tang, H.-Z.; Jen, A. K. Y.; Jakka, K.; Chou, C.-H.; Shu, C.-F., "A Side-Chain Dendronized Nonlinear Optical Polyimide with Large and Thermally Stable Electrooptic Activity", *Macromolecules* 2004, 37, 248-250.

(14) Rostovtsev, V. V.; Green, L. G.; Fokin, V. V.; Sharpless, K. B., "A Stepwise Huisgen Cycloaddition Process: Copper$^{(I)}$-Catalyzed Regioselective "Ligation" of Azides and Terminal Alkynes", *Angew. Chem. Int. Ed.* 2002, 41, 2596-2599.

(15) Tornoe, C. W.; Christensen, C.; Meldal, M., "Peptidotriazoles on Solid Phase: [1,2,3]-Triazoles by Regiospecific Copper(I)-Catalyzed 1,3-Dipolar Cycloadditions of Terminal Alkynes to Azides", *J. Org. Chem.* 2002, 67, 3057-3064.

(16) Binder, W. H.; Sachsenhofer, R., "'Click' chemistry in polymer and materials science", *Macromol. Rapid Comm.* 2007, 28, 15-54.

(17) Bock, V. D.; Hiemstra, H.; van Maarseveen, J. H., "Cu (I)-catalyzed alkyne-azide click cycloadditions from a mechanistic and synthetic perspective", *Eur. J. Org. Chem.* 2005, 51-68.

(18) Fournier, D.; Hoogenboom, R.; Schubert, U.S., "Clicking polymers: A straightforward approach to novel macromolecular architectures", *Chem. Soc. Rev.* 2007, 36, 1369-1380.

(19) Lutz, J.-F., "1,3-dipolar cycloadditions of azides and alkynes: a universal ligation tool in polymer and materials science", *Angew. Chem. Int. Ed. Engl.* 2007, 46, 1018-1025.

(20) Diaz, D. D.; Punna, S.; Holzer, P.; McPherson, A. K.; Sharpless, K. B.; Fokin, V. V.; Finn, M. G., "Click chemistry in materials synthesis. 1. Adhesive polymers from copper-catalyzed azide-alkyne cycloaddition", *J. Polym. Sci., Pol. Chem.* 2004, 42, 4392-4403.

(21) Cohen, H. L., "The preparation and reactions of polymeric azides. II. The preparation and reactions of various polymeric azides", *J. Polym. Sci., Pol. Chem.* 1981, 19, 3269-3284; Cohen, H. L., "The preparation and reactions of polymeric azides. I. The reaction of poly(vinylbenzyl azide) with acetylenic and olefinic derivatives", *J. Polym. Sci., Pol. Chem.* 1981, 19, 1337-1347.

(22) Ladmiral, V.; Mantovani, G.; Clarkson, G. J.; Cauet, S.; Irwin, J. L.; Haddleton, D. M., "Synthesis of Neoglycopolymers by a Combination of \"Click Chemistry\" and Living Radical Polymerization", *J. Am. Chem. Soc.* 2006, 128, 4823-4830.

(23) Sumerlin, B. S.; Tsarevsky, N. V.; Louche, G.; Lee, R. Y.; Matyjaszewski, K., "Highly efficient \"click\" functionalization of poly(3-azidopropyl methacrylate) prepared by ATRP", *Macromolecules* 2005, 38, 7540-7545.

(24) James, N. R.; Jayakrishnan, A., "Synthesis, polymerization, and copolymerization of aliphatic vinyl azide", *J. Appl. Polym. Sci.* 2003, 87, 1852-1857.

(25) Li, Y.; Yang, J.; Benicewicz, B. C., "Well-controlled polymerization of 2-azidoethyl methacrylate at near room temperature and click functionalization", *J. Polym. Sci., Pol. Chem.* 2007, 45, 4300-4308.

(26) Vogt, A. P.; Sumerlin, B. S., "An Efficient Route to Macromonomers via ATRP and Click Chemistry", *Macromolecules* 2006, 39, 5286-5292.

The invention claimed is:

1. A crosslinking process for polymers containing chromophoric groups, by thermal Huisgen reaction, in the absence of catalyst.

2. The crosslinking process as claimed in claim 1, wherein at least one azide function and at least one alkyne function are present on at least one from among the polymer or precursors thereof.

3. The process as claimed in claim 2, wherein the azide function and/or the alkyne function are present on the chromophoric groups.

4. The process as claimed in claim 1, wherein the polymer has a main chain of monomers chosen from the group comprising acrylic, methacrylic and vinyl monomers, and mixtures thereof.

5. The process as claimed in claim 1, wherein the chromophoric group is a chromophoric group with nonlinear quadratic hyperpolarizability.

6. The process as claimed in claim 1, wherein the crosslinking is performed according to a reaction scheme chosen from the group comprising:

Scheme 1:
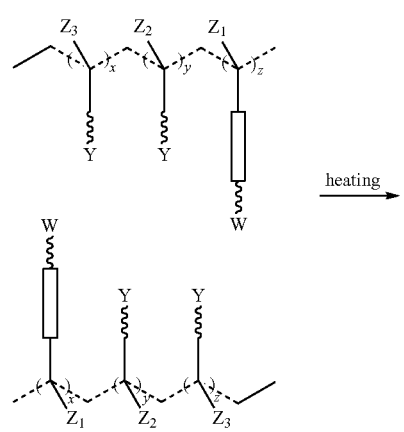
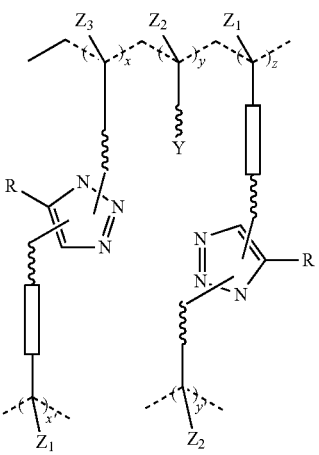
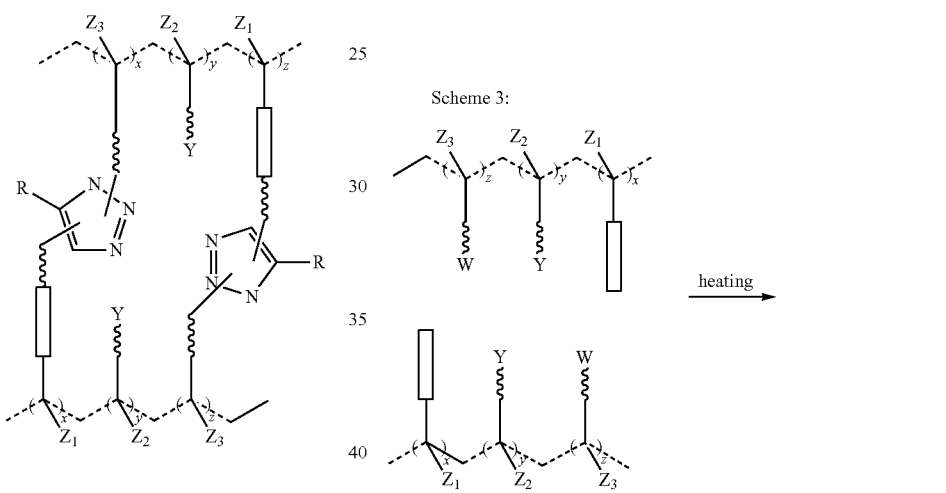
Scheme 2
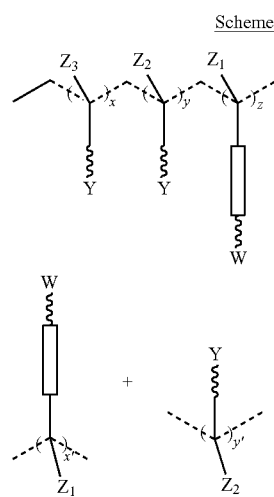
Scheme 3:
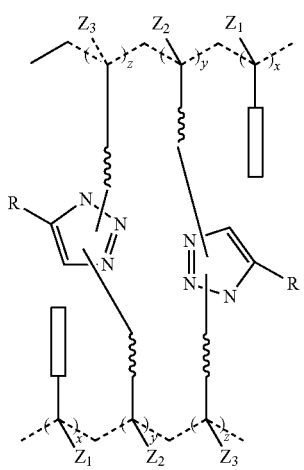

Scheme 4:
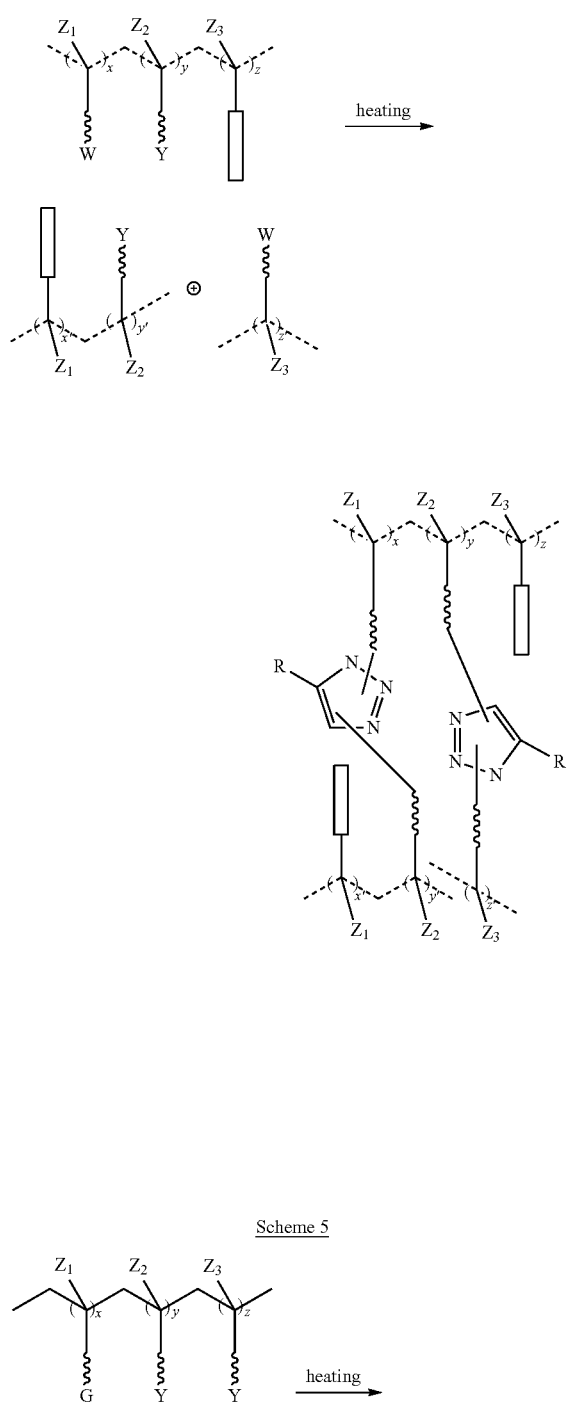
Scheme 5:
Scheme 6:
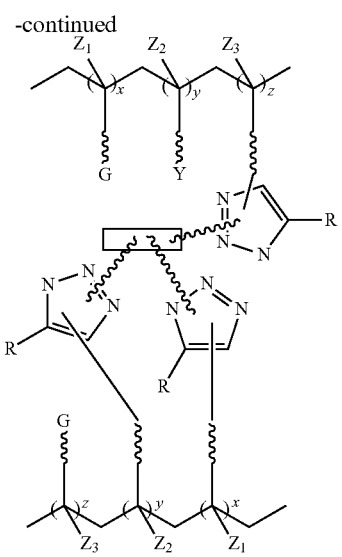
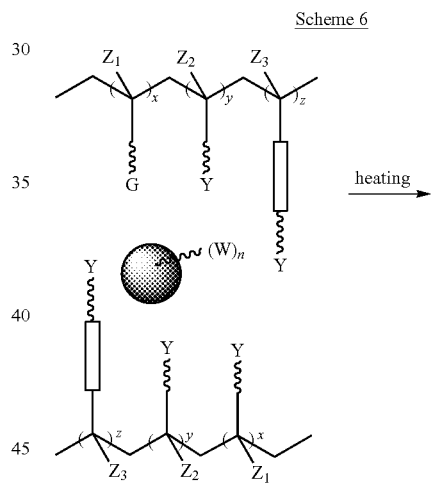

Scheme 7

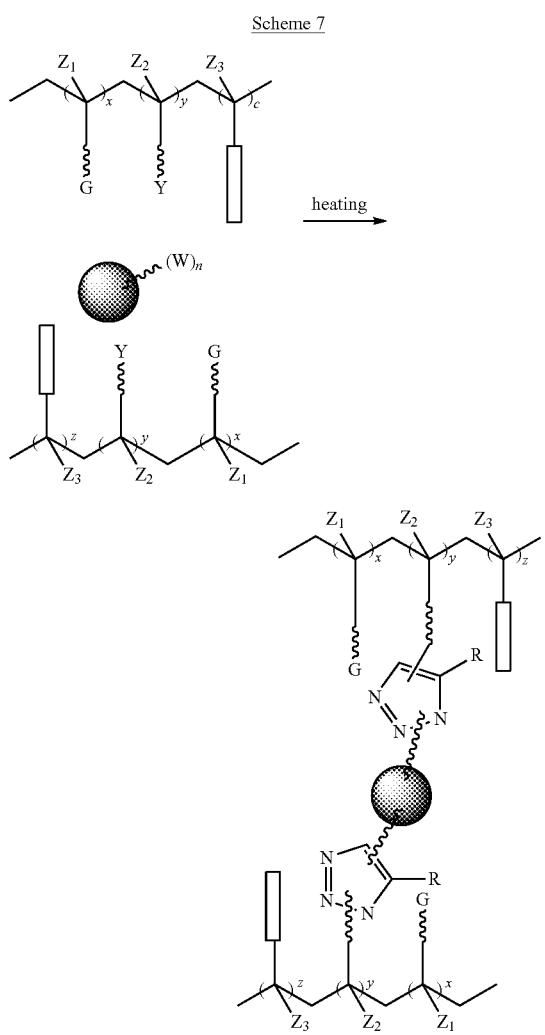

in which:

represents a chromophore with nonzero quadratic hyperpolarizability;

$Z_1$, $Z_2$ and $Z_3$ represent, independently of each other, H, $C_1$-$C_4$ alkyl or phenyl;

G is a group that is neutral towards crosslinking;

is any chemical species;

n is an integer greater than 1;

-\~\~\~ represents a connector;

represents the repeating unit of the polymer;

x, y, z, x', y' and z' represent, independently of each other, an integer between 0 and 100, it being understood that in each of the reaction schemes, two from among x, y, z and two from among x', y' and z' are nonzero, W and Y are such that when Y represents $N_3$, then W represents

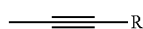

and when W represents $N_3$, then Y represents

R being chosen from the group comprising H, a linear, branched or cyclic, saturated or unsaturated hydrocarbon-based chain, optionally containing aromatic units optionally comprising heteroatoms such as O, S and N, and optionally substituted with electron-donating groups such as —$OCH_3$, —N(alkyl)$_2$ or with electron-accepting groups such as —CN, —$CO_2$alkyl, —$NO_2$, R may also represent a protecting group for an ethylyne function, preferably an alkylsilyl, an arylsilyl or an alkylarylsilyl, and even more preferentially trimethylsilyl, triisopropylsilyl, dimethyl-tert-butylsilyl, diphenyl-tert-butylsilyl or terphenylsilyl.

7. The process as claimed in claim 1, wherein the crosslinking by Huisgen reaction is performed at a temperature around the glass transition temperature of the polymer.

8. The process as claimed in claim 7, wherein the temperature of crosslinking by Huisgen reaction is ranged from 120° to 200° C.

9. A chromophoric polymer that may be heat-crosslinked via the process as claimed in claim 1, having the general formula (I) to (IV):

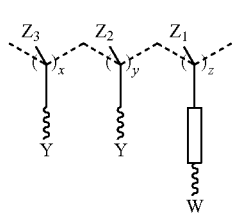 (I)

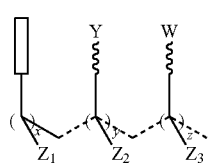 (II)

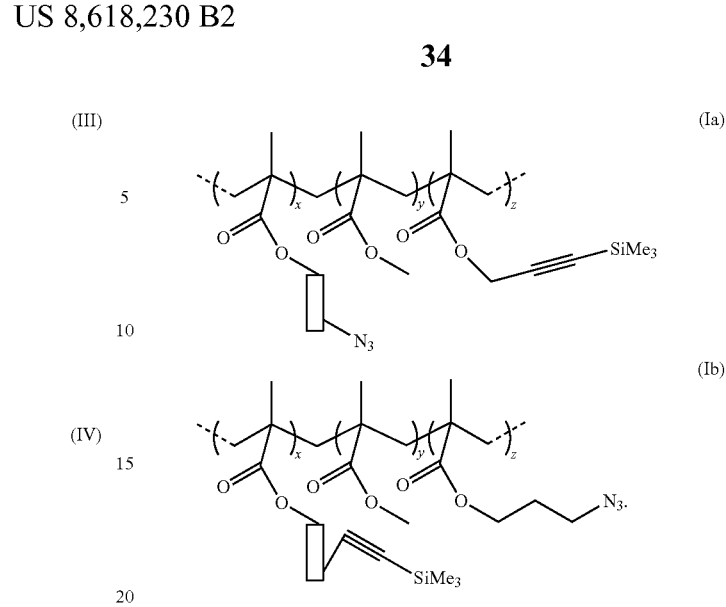
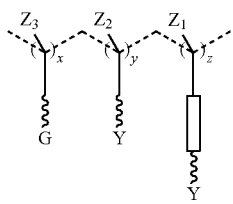
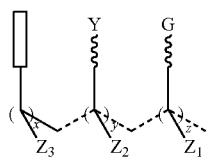
the various elements being as defined in claim 6.
10. The chromophoric polymer that may be crosslinked as claimed in claim 9, which is chosen from the group comprising:
11. The polymer as claimed in claim 10, in which the monomer is of methacrylic type and the chromophore is a Disperse Red One (DR1) derivative, chosen from the group comprising the polymers of formulae (I′ a) and (I′ b)
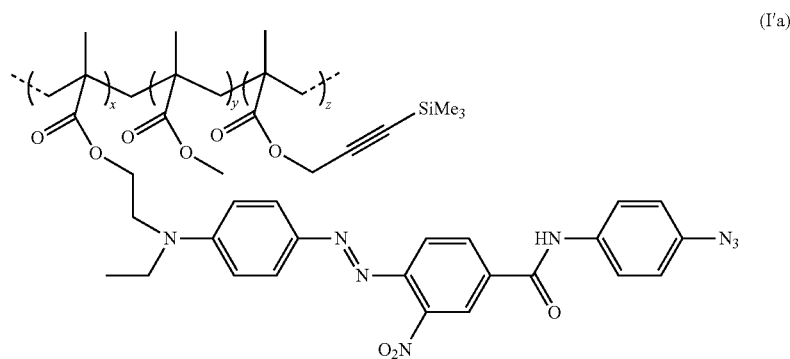
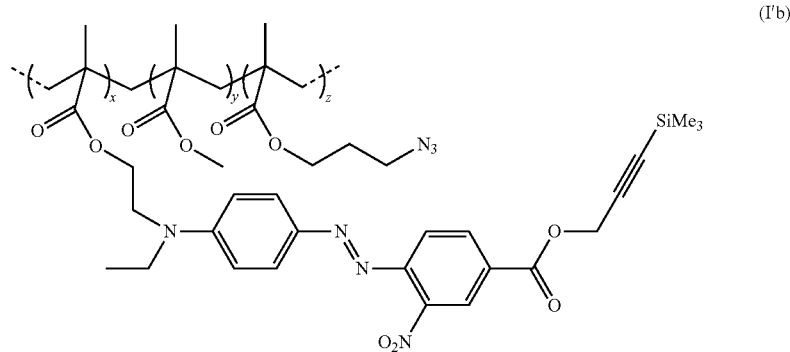

with x, y and z representing, independently of each other, an integer between 0 and 7, it being understood that only one from among x, y and z may represent 0.

12. A crosslinking process for polymers containing chromophoric groups, by thermal Huisgen reaction, in the absence of catalyst, wherein the polymer as defined in claim 9 is subjected to the following successive steps:
    formation of a film;
    orientation of the chromophores; and
    crosslinking.

13. The process as claimed in claim 12, wherein the step of orienting the chromophores and of crosslinking includes the following stages:
    1. heating the film to a temperature T1;
    2. applying a voltage V between the film and a conductive wire placed a distance d above the film, while keeping the temperature at the value T1 for a time D1;
    3. heating and maintaining the film at a temperature T2 for a time D2 while maintaining the electrical voltage;
    4. cooling to room temperature, while maintaining the electrical voltage;
    T1 being at a temperature that is about 25° C. higher or lower than the Tg;
    V being between 10 V and 8 kV;
    d being between 1 and 15 mm;
    T2 is between 120 and 200° C.;
    the times D1 and D2 being, independently of each other, between 30 minutes and 2 hours.

14. The process as claimed in claim 12, wherein the step of forming the film is performed by centrifugal induction with a solution of the polymer in a solvent chosen from the group comprising a halogenated solvent.

15. The process as claimed in claim 14, wherein the centrifugal induction is followed by annealing, the annealing being performed at a temperature ranged from 40 and 80° C., for a time of 30 minutes to 2 hours.

16. A polymerized crosslinked material obtained from a process as claimed in claim 12, having orientation stability of the chromophores such that the reduction in the nonlinear optical property is less than 5% after maintaining said material for 1000 hours at a temperature of 85° C.

17. The polymerized crosslinked material obtained from a process as claimed in claim 12, with a Tg at least 10° C. higher than that of the polymer from which it was obtained.

18. The polymerized crosslinked material obtained from a process as claimed in claim 12, which is insoluble in THF and in halogenated solvents.

19. The polymerized material crosslinked obtained from a process as claimed in claim 12, which is in the form of a film with a thickness (e) ranged from 0.1 to 5 μm.

20. The polymerized material crosslinked obtained from a process as claimed in claim 12, wherein its electrooptic coefficient $r_{33}$ is independent of its thickness (e).

21. The process as claimed in claim 5 wherein the chromophoric group is a chromophoric group of "push-pull" type.

22. The process as claimed in claim 5 wherein the chromophoric group has the general structure D-π-A in which D is an electron donor, A is an electron acceptor and π is a π bridge.

23. The polymer as claimed in claim 11 wherein the combinations of x, y and z are chosen from the group comprising:
    x=3, y=3 and z=4 and x=3, y=0 and z=7.

24. The polymer of claim 18 wherein said halogenated solvent is a chlorinated solvent.

25. The polymer of claim 24 wherein said chlorinated solvent is trichloroethane or ortho-dichlorobenzene.

* * * * *